(12) United States Patent
Critelli et al.

(10) Patent No.: US 7,174,644 B2
(45) Date of Patent: Feb. 13, 2007

(54) HANDSAW WITH BLADE STORAGE AND AUXILIARY BLADE

(75) Inventors: James M. Critelli, Fuquay-Varina, NC (US); Stephen E. Donelson, Raleigh, NC (US)

(73) Assignee: Cooper Brands, Inc., Houston, TX (US)

( * ) Notice: Subject to any disclaimer, the term of this patent is extended or adjusted under 35 U.S.C. 154(b) by 295 days.

(21) Appl. No.: 10/845,047

(22) Filed: May 13, 2004

(65) Prior Publication Data

US 2005/0252007 A1 Nov. 17, 2005

(51) Int. Cl.
B23D 51/03 (2006.01)
B23D 51/02 (2006.01)

(52) U.S. Cl. .............................. 30/512; 30/507; 30/513

(58) Field of Classification Search .......... 30/506–514, 30/517–520, 122; D8/95, 96, 99
See application file for complete search history.

(56) References Cited

U.S. PATENT DOCUMENTS

| 766,077 | A |   | 7/1904 | Tilden |   |
|---|---|---|---|---|---|
| 925,112 | A | * | 6/1909 | Leland | 30/513 |
| 1,028,230 | A |   | 4/1912 | Leonard |   |
| 1,080,365 | A |   | 12/1913 | O'Neill et al. |   |
| 1,187,460 | A |   | 6/1916 | Jull |   |
| 1,197,430 | A |   | 9/1916 | Barnes et al. |   |
| 1,206,638 | A |   | 11/1916 | Wren |   |
| 1,245,345 | A |   | 11/1917 | Howell |   |
| 1,394,174 | A |   | 10/1921 | Ireland et al. |   |
| 1,517,827 | A |   | 12/1924 | De Grado |   |
| 1,522,598 | A |   | 1/1925 | Smith |   |
| 1,565,861 | A |   | 12/1925 | McIntire |   |
| 1,695,231 | A |   | 11/1928 | Egan |   |
| 1,835,638 | A | * | 12/1931 | Cunneen | 30/513 |
| 1,905,482 | A | * | 4/1933 | Magri | 30/519 |
| 2,173,365 | A |   | 9/1939 | Kessler |   |
| 2,197,285 | A | * | 4/1940 | Wright et al. | 30/510 |
| 2,514,880 | A |   | 7/1950 | Leatherman |   |
| 2,580,896 | A |   | 1/1952 | Dohner |   |
| 2,604,130 | A |   | 7/1952 | Derby |   |
| 2,658,541 | A |   | 11/1953 | Heuneman |   |

(Continued)

OTHER PUBLICATIONS

Advertisement for "Lenox Gold Utility Blade." From *Tools of the Trade*. Nov./Dec. 2004, vol. 12, No 6., p. 23, ISSN: 1534-2425.

Primary Examiner—Boyer D. Ashley
Assistant Examiner—Edward Landrum
(74) Attorney, Agent, or Firm—Coats & Bennett, P.L.L.C.

(57) ABSTRACT

A saw and/or saw frame including: an elongate substantially rigid back member and a swing arm pivotally connected to the back member so as to be rotatable between an extended position and a storage position; a handle with a first blade mount; the swing arm includes a second blade mount; the back includes a third blade mount disposed proximate to the swing arm; each of the first, second, and third blade mounts being constructed to engage one end of a removably mounted saw blade, with the first, second, and third blade mounts disposed to allow quick changes in blade configuration. The back member also has an elongate blade storage cavity accessible from above adapted to store at least one of the removably mounted saw blades and an auxiliary blade mounting mechanism configured to operatively mount an auxiliary blade extending forward from the frame.

26 Claims, 6 Drawing Sheets

U.S. PATENT DOCUMENTS

| | | | |
|---|---|---|---|
| 2,662,567 A | 12/1953 | La Roche | |
| D174,993 S | 6/1955 | Lindsay | |
| 2,767,751 A | 10/1956 | Sioblom | |
| 2,782,821 A | 2/1957 | Gunnerson | |
| 2,920,668 A * | 1/1960 | Leist | 30/510 |
| 3,028,888 A * | 4/1962 | Chapin et al. | 83/761 |
| 3,245,445 A * | 4/1966 | Herman et al. | 30/501 |
| 3,327,748 A | 6/1967 | Rueterfors | |
| 3,636,997 A | 1/1972 | Keymer | |
| 3,822,731 A | 7/1974 | Keymer | |
| D245,754 S | 9/1977 | Breger | |
| 4,349,059 A | 9/1982 | Hepworth et al. | |
| 4,367,779 A | 1/1983 | Ewig | |
| 4,466,471 A | 8/1984 | Thomson | |
| 4,630,373 A | 12/1986 | Staurseth | |
| 4,680,863 A | 7/1987 | Duffy | |
| 4,827,619 A | 5/1989 | Alm | |
| 4,835,869 A | 6/1989 | Waldherr | |
| D305,296 S | 1/1990 | Nelson | |
| 5,023,996 A | 6/1991 | Pape et al. | |
| D318,006 S | 7/1991 | Wanner et al. | |
| 5,044,083 A | 9/1991 | DeCarolis et al. | |
| D321,119 S | 10/1991 | Ciccone et al. | |
| 5,063,675 A | 11/1991 | Michas et al. | |
| D322,020 S | 12/1991 | Grachan | |
| D325,506 S | 4/1992 | Michas et al. | |
| 5,111,583 A | 5/1992 | Martinez Alcala | |
| D333,249 S | 2/1993 | Ciccone et al. | |
| D333,250 S | 2/1993 | Ciccone et al. | |
| 5,388,333 A | 2/1995 | Chen | |
| D359,436 S | 6/1995 | Weimann | |
| D363,888 S | 11/1995 | Williamson | |
| 5,471,752 A * | 12/1995 | Koetsch | 30/513 |
| 5,477,616 A | 12/1995 | Williams et al. | |
| D370,610 S | 6/1996 | Neyton | |
| 5,590,473 A | 1/1997 | Wang | |
| D379,292 S | 5/1997 | Schaffer et al. | |
| 5,661,908 A | 9/1997 | Chen | |
| 5,673,488 A | 10/1997 | Grayo | |
| 5,678,315 A | 10/1997 | Hartzell | |
| 5,706,585 A | 1/1998 | Wang | |
| 5,768,788 A | 6/1998 | Arnold | |
| 5,826,344 A | 10/1998 | Phelon et al. | |
| D403,224 S | 12/1998 | Martin et al. | |
| D406,035 S | 2/1999 | Erisoty et al. | |
| 5,873,170 A | 2/1999 | Stanley | |
| D409,892 S | 5/1999 | Juhlin | |
| 5,911,481 A | 6/1999 | Yost | |
| D426,445 S | 6/2000 | Hausler | |
| 6,070,330 A | 6/2000 | Phelon et al. | |
| 6,079,109 A | 6/2000 | Ranieri | |
| D428,321 S | 7/2000 | Ranieri | |
| 6,098,294 A | 8/2000 | Lemos | |
| 6,134,791 A | 10/2000 | Huang | |
| 6,158,131 A | 12/2000 | Costanzo et al. | |
| D436,824 S | 1/2001 | Douglas et al. | |
| 6,230,412 B1 | 5/2001 | Lin | |
| 6,266,887 B1 | 7/2001 | Owens et al. | |
| 6,298,564 B1 | 10/2001 | Voser et al. | |
| D450,555 S | 11/2001 | Juhlin | |
| D455,628 S | 4/2002 | Douglas | |
| 6,457,244 B1 | 10/2002 | Huang | |
| D472,445 S | 4/2003 | Juhlin et al. | |
| D473,445 S | 4/2003 | Snider | |
| D475,600 S | 6/2003 | Huang | |
| 6,578,268 B2 | 6/2003 | Hawketts | |
| D477,981 S | 8/2003 | Snider | |
| 6,606,795 B2 * | 8/2003 | Erisoty et al. | 30/512 |
| 2003/0056377 A1 * | 3/2003 | Huang | 30/513 |
| 2003/0196339 A1 * | 10/2003 | Snider | 30/513 |

* cited by examiner

HANDSAW WITH BLADE STORAGE AND AUXILIARY BLADE

BACKGROUND OF THE INVENTION

The present invention is directed generally to a handsaw formed from a frame and a removable main saw blade, where the main saw blade may be stored in the frame and the frame may support an auxiliary saw blade extending forward from the frame.

Numerous handsaw frames have been proposed and used through time. One typical saw frame structure is commonly referred to as a hacksaw frame. Hacksaw frames are generally U-shaped, with the relevant hacksaw blade operatively supported between forward and back downwardly extending frame portions. Examples of hacksaws of this general design can be found in U.S. Pat. Nos. 2,658,541; 2,767,751; and 3,636,997; and more recently in U.S. Pat. Nos. 5,471,752 and 6,230,412. While such hacksaws have been found useful in a variety of situations, there remains a need for alternative handsaw designs.

SUMMARY OF THE INVENTION

The present invention is directed to a saw and/or saw frame comprising: an elongate substantially rigid back member, a handle portion, and a swing arm pivotally connected to the back member distal from the handle portion so as to be rotatable between an extended position generally transverse to the back member and a storage position generally parallel and aligned with the back member; the handle portion comprising at least a first blade mount; the swing arm comprising at least a second blade mount; the back member comprising at least a third blade mount disposed proximate to the swing arm; each of the first, second, and third blade mounts being constructed to engage one end of a removably mounted saw blade of a first type; wherein the first, second, and third blade mounts are disposed with the swing arm in the extended position such that a first distance between the first and second blade mounts substantially equals a second distance between the first and third blade mounts; the back member further comprising an auxiliary blade mount mechanism adapted to removably mount an auxiliary saw blade of a second type operatively extending forward from the frame; the back member further comprising a blade storage cavity adapted to store at least one of the saw blades.

The auxiliary blade mount mechanism may comprise an auxiliary blade mount, a bearing surface disposed forward and above the auxiliary blade mount, and an auxiliary blade holder disposed forward and below the auxiliary blade mount. The auxiliary blade mount, bearing surface, and auxiliary blade holder may all be disposed on a side opposite the third blade mount. The saw may further comprise a quick-release blade tensioning mechanism operative to releasably apply a selectable amount of tension to the first blade mount; and wherein the frame allows conversion from a first configuration with a removably mounted saw blade connected between the first and second blade mounts and a second configuration with the saw blade connected between the first and third blade mounts without adjustment to the selected amount of tension. The saw frame may further comprise a fourth blade mount; wherein the swing arm further comprises a fifth blade mount; wherein the fourth and fifth blade mounts are non-coplanar with the first, second, and third blade mounts, but are spaced a third distance from each other substantially equal to the first distance with the swing arm in the extended position. The saw frame may further comprise at least one magnet, preferably at least two magnets spaced from each other, associated with the blade storage cavity. The blade mounts may comprise a tapered pin. The back member may further comprise an upwardly opening channel in which the swing arm is disposed in the storage position. The back member may further comprise a downwardly extending lobe proximate the swing arm, the third blade mount disposed on the lobe, and the lobe may comprise a bearing surface that limits the rotational movement of the swing arm. A first theoretical line between the first and second blade mounts may be disposed substantially parallel to the back member and a second theoretical line between the first and third blade mounts may be disposed angled with respect to the back member. The saw may further comprise at least one saw blade. The handle portion may comprise a grip portion integrally formed with the back member. The handle portion may further comprise a quick-release blade tensioning mechanism operative to releasably apply tension to the first blade mount. The quick-release blade tensioning mechanism may comprise an operating lever pivotally mounted in an upper portion of the handle portion. The blade storage cavity may be elongate and accessible from above the blade storage cavity may be adapted to store more or more of the blades of the first or second types, optionally at least one of each type simultaneously.

DETAILED DESCRIPTION OF THE INVENTION

The handsaw according to the present invention allows the user to easily change the orientation of the longitudinal axis of a main saw blade between two different configurations each supported on both ends by the saw's frame, to store at least one of such saw blades in the frame of the handsaw, and to attach an auxiliary saw blade to the frame that extends forward from the frame. For clarity of discussion, and without limiting the scope of the attached claims, the main saw blade (which when operatively mounted is supported on both ends) be may be referred to as a hacksaw blade, while the auxiliary saw blade (which when operatively mounted is not supported on both ends) may be referred to as a jabsaw blade.

Figure 1:
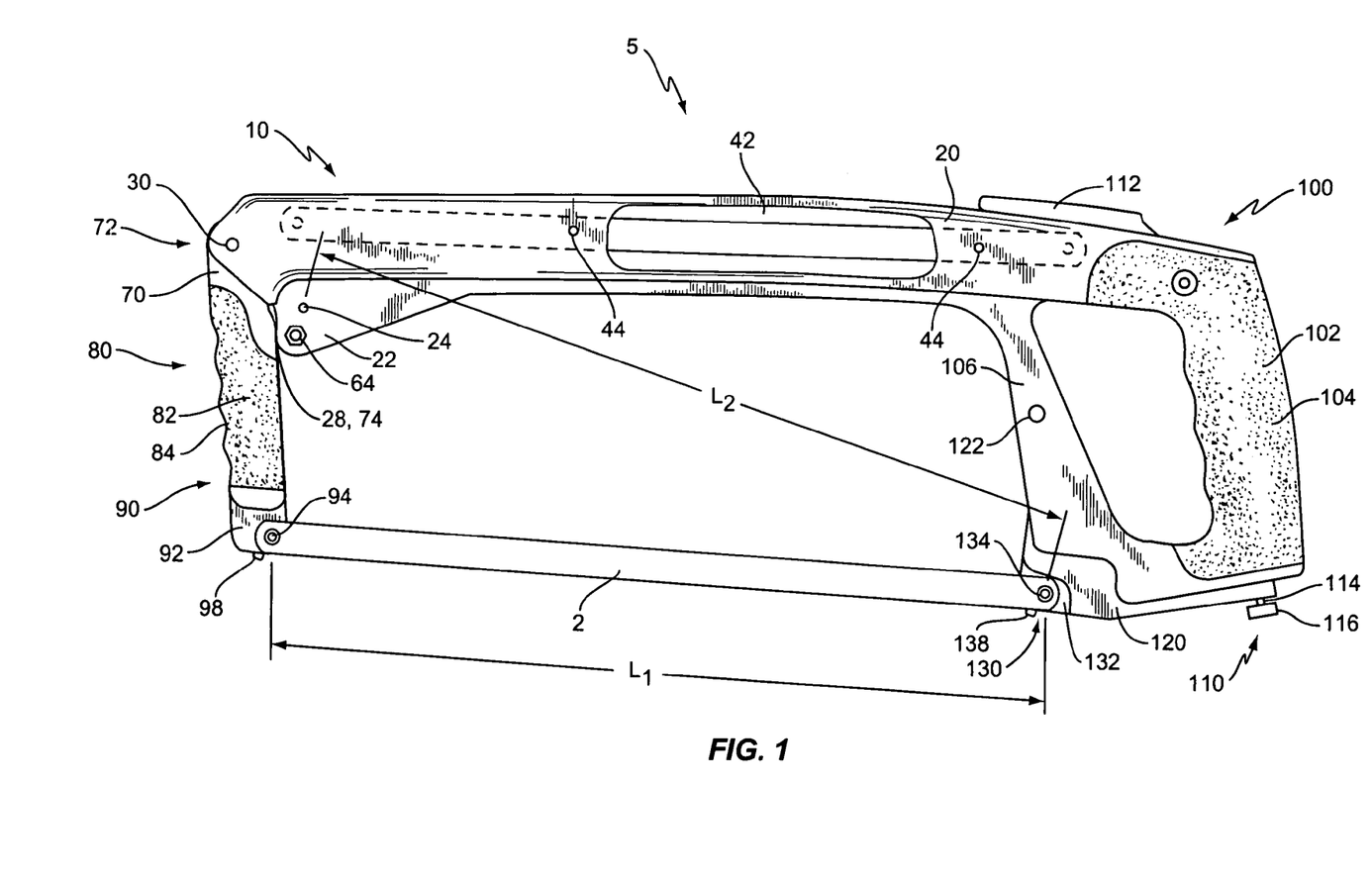
FIG. 1 shows a side view of a handsaw constructed in accordance with one embodiment of the present invention, with the main saw blade in the horizontal configuration (with vertical cant) and the swing arm in the extended position.

As illustrated in the Figures, a handsaw according to one embodiment of the present invention, generally designated 5, includes a frame 10 for supporting a hacksaw blade 2. The frame 10 includes a spine (or back member) 20 that is generally elongate so as to separate a handle portion 100 from a swing arm 70. While the spine 20 shown in FIG. 1 is generally rectilinear along longitudinal axis 21, the spine 20 may alternatively be sinuous, curved, or take any other shape known in the art. The spine 20 includes a pivot 30 and a swing arm storage cavity 32 toward its front (see FIG. 3) for pivotally mounting and storing the swing arm 70 as discussed further below. The spine 20 further includes a downwardly extending lobe 22 on its lower side, proximate the swing arm 70. The lobe 22 provides a location for a hacksaw blade mount 24 on the spine 20, as discussed further below. In addition, the lobe 22 may advantageously provide a stop face 28 as a rotational positive stop for the swing arm 70.

Figure 2:
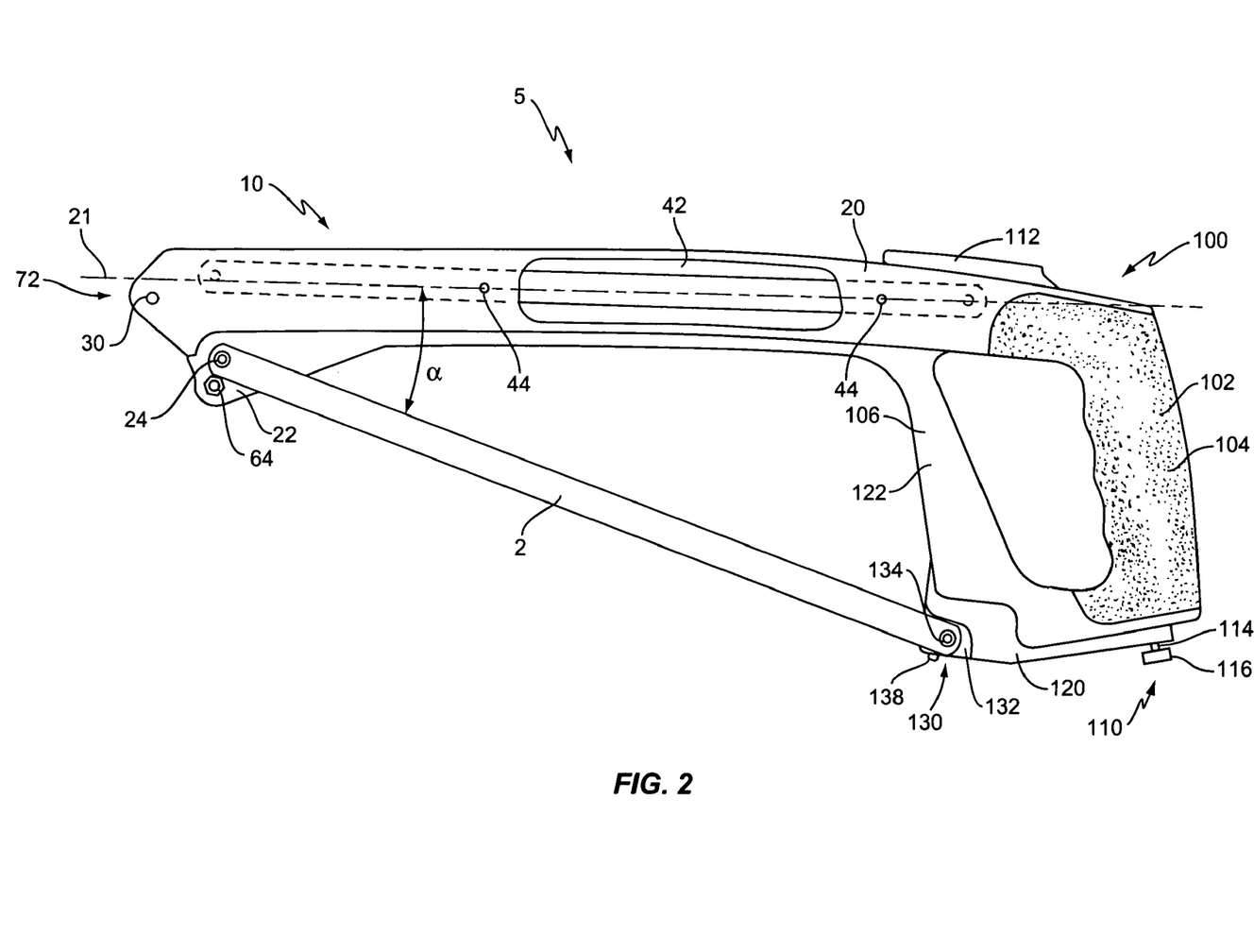
FIG. 2 shows a side view of the handsaw of FIG. 1 with the main saw blade in the reduced space configuration and the swing arm in the storage position.

The swing arm 70 is pivotally mounted to the spine 20 so as to be rotatable between an extended position (FIG. 1) and a storage position (FIG. 2). In the extended position, the swing arm 70 extends downwardly with respect to the spine 20, while in the storage position, the swing arm 70 is generally parallel and aligned with the spine 20, and advantageously disposed in the swing arm storage cavity 32. The swing arm 70 includes an upper portion 72, a grip portion 80, and a lower portion 90. The upper portion 72 is rotatably coupled to the spine 20 via pivot 30, which may be of any known type. Advantageously, the pivot 30 takes the form of a simple pin extending through two forwardly extending flanges on the spine 20 and a corresponding pin passage (not shown) through the upper portion 72 of the swing arm 70. The upper portion 72 may further include a stop face 74 for abutting the lobe 22 in order to provide a positive stop for rotation of the swing arm 70. Alternative means of limiting the amount of rotation of the swing arm 70 may alternatively be used. The grip portion 80 of the swing arm 70 advantageously includes a plurality of contoured finger indentations 84 and is advantageously covered by a suitable cushion material 82 such as a thermoplastic elastomer. The lower portion 90 of the swing arm 70 provides a location for operatively mounting the main hacksaw blade 2. The lower portion 90 may include a notched area forming a main blade support face 92 with a main blade mount 94 disposed thereon. The lower portion 90 may advantageously also include a secondary blade supporting face 96 and secondary blade mount 98 for supporting the hacksaw blade 2 in a 45° orientation.

Figure 4:
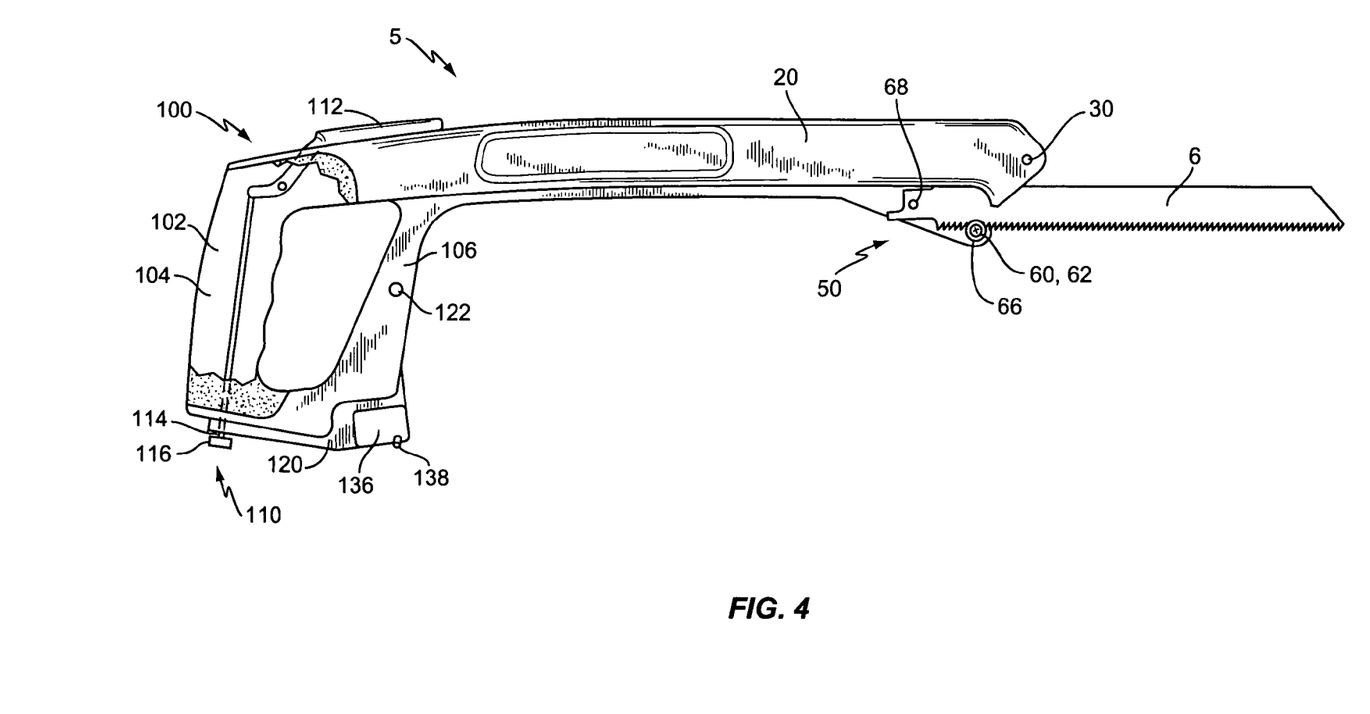
FIG. 4 shows a side view from the opposite side of the handsaw of FIG. 2 with the main blade removed and the auxiliary blade operatively mounted.
Figure 5:
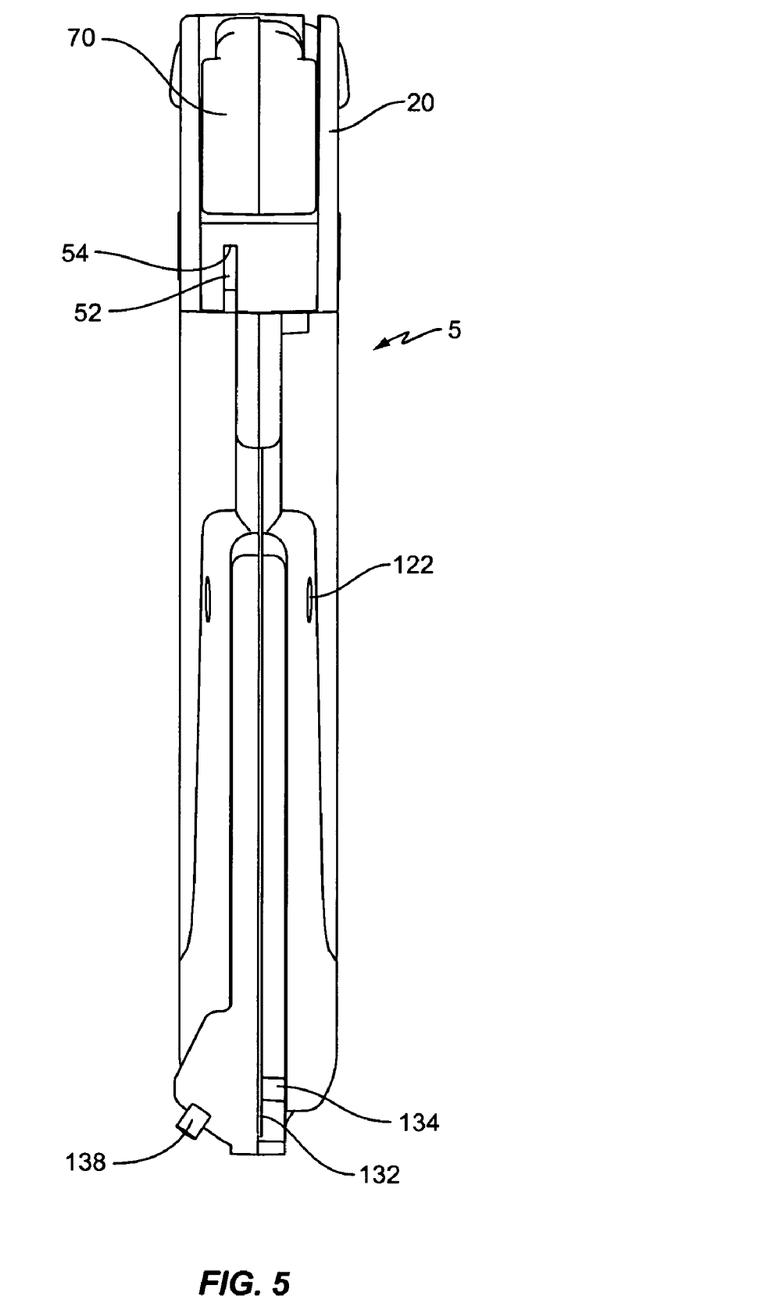
FIG. 5 shows a front view of the handsaw of FIG. 1 with the main blade removed and the swing arm in the storage position.

The handle 100 is connected to, or integrally formed with, the rear portion of the spine 20. The handle 100 may include a grip area 102, hand guard 106, at least one blade mount 134, and a blade tensioning mechanism 110. The grip area 102 is intended to be gripped by the user's hand and may include a suitable cushion 104 if desired. The hand guard 106 is positioned in front of the grip area 102, with an opening therebetween, and advantageously provides protection for the user's hand and additional rigidity for the frame 10. The blade tensioning mechanism 110 includes a lever 112, a pivot body 120, and a connecting rod 114 running therebetween. The lever 112 is pivotally mounted at the upper portion of the handle 100 for movement between a closed/tension position generally parallel to the longitudinal axis 21 and an open/released position extending upward from the handle 100. The rear portion of the lever 112 couples to the connecting rod 114, which runs interiorly of the grip area 102 to the lower portion of the handle 100. The connecting rod 114 operatively connects the lever 112 to the pivot body 120 (see FIG. 4). The pivot body 120 is pivotally mounted to the middle area of the hand guard 106 and extends from that pivot point 122 down along the hand guard 106 (mostly interiorly) and back toward the grip 102. The lower forward portion of the pivot body 120 includes a blade mounting area 130 that includes a main blade support face 132 with a main blade mount 134 thereon, and optionally a secondary blade support face 136 and secondary blade mount 138. The rear portion of the pivot body 120 includes a hole through which the connecting rod 114 extends to engage a tension adjusting knob 116. By changing the setting of the tension adjusting knob 116, the "locked" position of the main blade mount 134 (and the optional secondary blade mount 138) may be adjusted, thereby adjusting the tension setting for the hacksaw blade 2. This blade tension mechanism 110 is advantageously of the "over-center locking" type.

With the swing arm 70 down in the extended position, the distance $L_1$ between blade mount 134 and blade mount 94 on the swing arm 70 is substantially equal to distance $L_2$ between blade mount 134 and blade mount 24 on the lobe 22 of the spine 20. This arrangement allows the hacksaw blade 2 to be easily changed from a normal horizontal mounting basically parallel to the spine 20 (FIG. 1) to a reduced space mounting where the mounted hacksaw blade 2 is angled at angle α relative to the spine 20 (FIG. 2) so as to reduce the front profile of the saw 5, all without requiring an adjustment to the tension setting of the blade tension mechanism 110 via knob 116. To achieve this, the user simply pulls up on the lever 112, which releases tension on the blade 2, decouples the forward end of the blade 2 from blade mount 94, rotates the swing arm 70 to its storage position in swing arm storage cavity 32, couples the forward end of the blade 2 to blade mount 24 on the lobe 22 of the spine 20, and returns the lever 112 to the locked position. A reverse process can also be used to change from the reduced space mounting to the normal horizontal mounting when desired. This type of two-position frame 10 conversion is generally described in U.S. Pat. No. 6,606,795, the disclosure of which is incorporated herein by reference.

It is intended that blade mounts 24, 94, 134 will be disposed so as to all lie in one plane that advantageously includes the longitudinal axis 21 of the spine 20; these blade mounts 24, 94, 134 are intended for a "vertical" mounting of a hacksaw blade 2. Likewise, the secondary blade mounts 98, 138 are intended to all lie in another plane that is angled 45° with respect thereto; these blade mounts 98, 138 are intended for a "45°" mounting of a hacksaw blade 2. Further, while not required for all embodiments, the distance between blade mounts 98, 138 may advantageously also be substantially equal to $L_1$ with the swing arm 70 in the down position. Note that due to the presence of the auxiliary blade mounting mechanism 50, discussed below, there may or may not be a blade mount on the spine 20 corresponding to the 45° blade mounting orientation, meaning that there may or may not be the ability to quickly change from the horizontal blade orientation to the angled orientation (i.e., front end of blade mounted to spine 20, not swing arm 70) with the blade at a 45° cant in both orientations.

Figure 3:
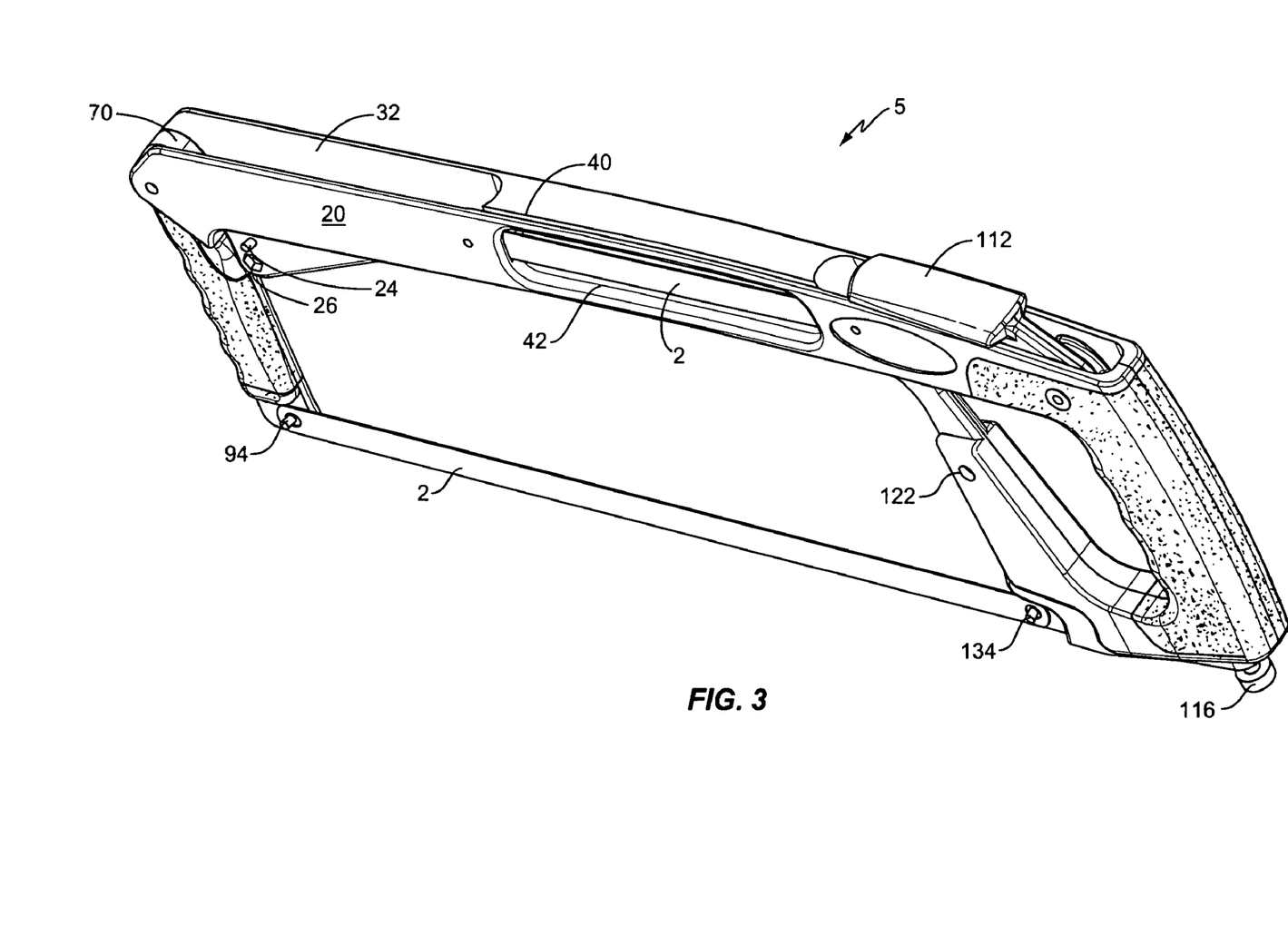
FIG. 3 shows a perspective view of the handsaw of FIG. 1 from above and behind, showing the blade storage cavity.

The spine 20 further includes a blade storage cavity 40 for storing extra hacksaw blades 2 or jabsaw blades 6. The blade storage cavity 40 typically takes the form of a relatively deep slot formed in the upper surface of the spine 20, that may or may not be connected to the swing arm storage cavity 32. One or more magnets 44 may be mounted in the spine 20 so as to face the blade storage cavity 40; advantageously, there are two or more such magnets 44 at locations spaced from one another. In addition, an access aperture 42 on the side of the spine 20 may connect to the blade storage cavity 40; this access aperture 42 allows the user to visually see if a blade 2 is in the blade storage cavity 40 and to contact the blade 2 to urge the same out of the blade storage cavity 40. It is believed advantageous if the blade storage cavity 40 has a relatively narrow cross section proximate the access aperture 42 so as to provide a resistance surface when the user is urging the blade 2 out of the blade storage cavity 40 with a finger. The rear portion of the blade storage cavity 40 may be enlarged if desired to aesthetically balance the swing arm cavity 32 and to provide additional access to any saw blades 2 stored in the blade storage cavity 40. It should be noted that having an open top blade storage cavity 40 as shown in FIG. 3 allows for one or more blades 2, 6 to be stored in the blade storage cavity 40 and to be added and/or removed from above. While not required for all embodiments, the blade storage cavity may advantageously be sized to allow the simultaneous storage of at least one hacksaw blade 2 and at least one jabsaw blade 6.

The spine 20 further includes an auxiliary blade mounting mechanism 50 for supporting an auxiliary blade 6 that forwardly extends from the frame 10. This auxiliary blade 6 may be used as a "jab saw" blade, and is therefore sometimes referred to herein as a jabsaw blade 6, as indicated above. The auxiliary blade mounting mechanism 50 may include an auxiliary blade mount 68, an auxiliary blade holder 60, and a bearing surface 54. The auxiliary blade mount 68 may be disposed on the lobe 22 in a position spaced rearwardly from the frontmost portion of the spine 20. The blade holder 60 may be disposed forward of, and lower than, the auxiliary blade mount 68. In some embodiments, the blade holder 60 may take the form of a simple screw arrangement that helps hold the auxiliary blade 6 against the side of the lobe 22. The screw 62 may pass through a corresponding hole (not shown) in the lobe 22 to engage a nut 64. This nut 64 may be fitted in a corresponding recess 26 in the lobe 22 and may advantageously be secured to the lobe 22; alternatively, the hole in the lobe 22 may be threaded. If desired, a washer or pressing plate 66 may also be used to aid in pressing the auxiliary blade 6 against the lobe 22. Other forms of blade holders 60, such as spring clips, quarter-turn fasteners, magnets, or the like may alternatively be used with the understanding that a primary purpose of the blade holder 60 is to aid in keeping the auxiliary blade 6 engaged with the auxiliary blade mount 68 during use. The bearing surface 54 is disposed forward and upward of the auxiliary blade mount 68. The bearing surface 54 may advantageously be formed as the upper wall of a downwardly open longitudinally extending slot 52 on spine 20. When operatively mounted, the auxiliary blade 6 juts forward from the frame 10 and is supported from above by the bearing surface 54 and from below by the blade holder 60. The auxiliary blade mount 68 keeps the auxiliary blade 6 from moving longitudinally with respect to the frame 10 during use. It should be noted that the various portions of the auxiliary blade mounting mechanism 50 may advantageously be on the side of the spine 20 opposite that of the hacksaw blade mount 24 on the lobe 22 to avoid interfering with the main hacksaw blade mounting functions.

Figure 6:
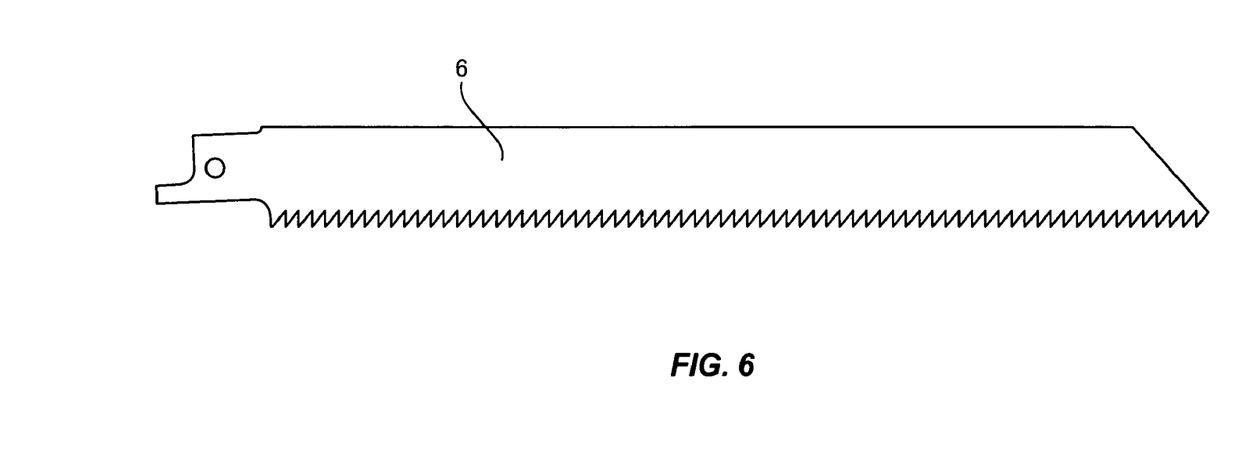
FIG. 6 shows one embodiment of an auxiliary blade.
Figure 7:
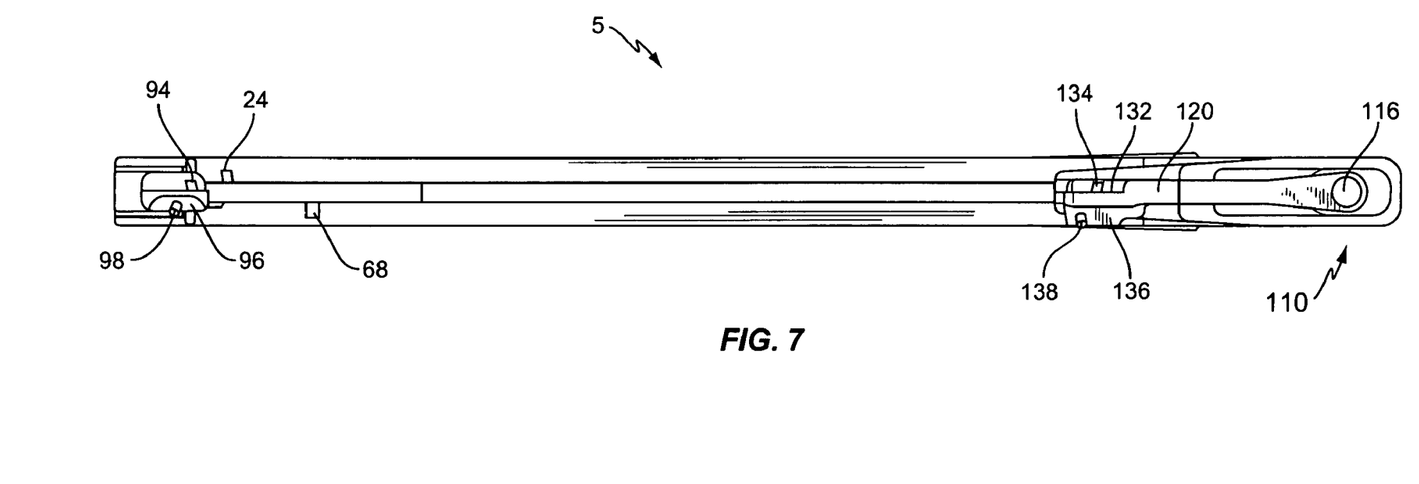
FIG. 7 shows a bottom view of the handsaw of FIG. 1 with the main blade removed to show one possible arrangement of blade mounts.

The jabsaw blade 6 may take the form shown in FIG. 6. Because this jabsaw blade 6 is expected to be subjected to significant loads and is supported in a cantilever fashion, the jabsaw blade 6 is typically much thicker and shorter than a conventional hacksaw blade 2. With this in mind, the blade storage cavity 40 may advantageously be sized to accommodate the jabsaw blade 6 when not mounted to the frame 10 via the auxiliary blade mounting mechanism 50.

While the disclosure above has been in terms of one embodiment of a lever-actuated blade tensioning mechanism 110, this particular mechanism is not required in all embodiments. Indeed, any one of a variety of blade tensioning mechanisms may be used, such as one operating according to any of the principles described in U.S. Pat. Nos. 1,187,460; 1,517,827; 3,636,997; 3,822,731; 4,349,059; 4,367,779; 4,466,471; 5,673,488; or 6,134,791. Additionally, the disclosures of U.S. patent applications Ser. Nos. 29/203,985 (filed 22 Apr. 2004) and 29/204,512 (filed 29 Apr. 2004) are incorporated herein by reference.

The various blade mounts 24, 94, 134, 98, 138, 68 discussed herein may advantageously take the form of a short slightly tapered, but otherwise cylindrical, pin that is press fitted into the corresponding location. Alternatively, the blade mounts 24, 94, 134, 98, 138, 68 may be integrally formed with the corresponding components or take other forms known in the art.

The majority of various parts of the frame 10 may be formed of aluminum, steel, various plastics, or other suitable rigid materials. As mentioned above, some or all of the grip surfaces 82, 102 may optionally be coated with a suitable cushioning material known in the art.

The present invention may, of course, be carried out in other specific ways than those herein set forth without departing from the essential characteristics of the invention. The present embodiments are, therefore, to be considered in all respects as illustrative and not restrictive, and all changes coming within the meaning and equivalency range of the appended claims are intended to be embraced therein.

What is claimed is:

1. A handsaw frame, comprising:
an elongate substantially rigid back member, a handle portion, and a swing arm pivotally connected to said back member distal from said handle portion so as to be rotatable between an extended position generally transverse to said back member and a storage position generally parallel and aligned with said back member;
said handle portion comprising at least a first blade mount;
said swing arm comprising at least a second blade mount;
said back member comprising at least a third blade mount disposed proximate to said swing arm;
each of said first, second, and third blade mounts being constructed to engage one end of a removably mounted saw blade of a first type; wherein said first, second, and third blade mounts are disposed with said swing arm in said extended position such that a first distance between said first and second blade mounts substantially equals a second distance between said first and third blade mounts;
said back member further comprising an auxiliary blade mount mechanism adapted to removably mount an auxiliary saw blade of a second type extending operatively forward from said frame; and
said back member further comprising a blade storage cavity adapted to store at least one of said removably mounted saw blades.

2. The saw frame of claim 1 wherein said auxiliary blade mount mechanism comprises an auxiliary blade mount, a bearing surface disposed forward and above said auxiliary blade mount, and an auxiliary blade holder disposed forward and below said auxiliary blade mount.

3. The saw frame of claim 2 wherein said auxiliary blade mount, bearing surface, and auxiliary blade holder are all disposed on a lateral side of said frame opposite said third blade mount.

4. The saw frame of claim 1 wherein said handle portion further comprises a quick-release blade tensioning mechanism operative to releasably apply a selectable amount of tension to said first blade mount; and wherein said frame allows conversion from a first configuration with a removably mounted saw blade connected between said first and second blade mounts and a second configuration with said saw blade connected between said first and third blade mounts without adjustment to said selected amount of tension.

5. The saw frame of claim 1 wherein said handle further comprises a fourth blade mount; wherein said swing arm further comprises a fifth blade mount; wherein said fourth and fifth blade mounts are non-coplanar with said first, second, and third blade mounts, but are spaced a third distance from each other substantially equal to said first distance with said swing arm in said extended position.

6. The saw frame of claim 1 further comprising at least one magnet associated with said blade storage cavity.

7. The saw frame of claim 6 wherein said at least one magnet comprises at least two magnets spaced from each other.

8. The saw frame of claim 1 wherein each of said blade mounts comprises a tapered pin.

9. The saw frame of claim 1 wherein said back member further comprises an upwardly opening channel in which said swing arm is disposed in said storage position.

10. The saw frame of claim 1 wherein said back member further comprises a downwardly extending lobe proximate said swing arm, said third blade mount disposed on said lobe.

11. The saw frame of claim 10 wherein said lobe comprises a bearing surface that limits the rotational movement of said swing arm.

12. The saw frame of claim 1 wherein a first theoretical line between said first and second blade mounts is disposed substantially parallel to said back member and a second theoretical line between said first and third blade mounts is disposed angled with respect to said back member.

13. The saw frame of claim 1 further comprising at least one saw blade.

14. The saw frame of claim 1 wherein said handle portion comprises a grip portion integrally formed with said back member.

15. The saw frame of claim 1 wherein said handle portion further comprises a quick-release blade tensioning mechanism operative to releasably apply tension to said first blade mount.

16. The saw frame of claim 15 wherein said quick-release blade tensioning mechanism comprises an operating lever pivotally mounted in an upper portion of said handle portion.

17. The saw frame of claim 1 wherein said blade storage cavity is elongate and accessible from above.

18. The saw frame of claim 1 wherein said blade storage cavity is adapted to store one or more removably mounted saw blades of the first and second types.

19. The saw frame of claim 18 wherein said blade storage cavity is adapted to store one or more removably mounted saw blades of the first and second types simultaneously.

20. The saw frame of claim 1:
further comprising at least one magnet associated with said blade storage cavity;
wherein said back member further comprises an upwardly opening channel in which said swing arm is disposed in said storage position and a downwardly extending lobe proximate said swing arm, said third blade mount disposed on said lobe;
wherein each of said blade mounts comprises a tapered pin;
wherein said blade storage cavity is elongate and accessible from above;
wherein said blade storage cavity is adapted to store one or more removably mounted saw blades of the first and second types; and
wherein said handle portion further comprises a quick-release blade tensioning mechanism operative to releasably apply a selectable amount of tension to said first blade mount; and wherein said frame allows conversion from a first configuration with a removably mounted saw blade connected between said first and second blade mounts and a second configuration with said saw blade connected between said first and third blade mounts without adjustment to said selected amount of tension.

21. The saw frame of claim 20 wherein said quick-release blade tensioning mechanism comprises an operating lever pivotally connected to an upper portion of said handle portion.

22. The saw frame of claim 20 wherein said handle further comprises a fourth blade mount; wherein said swing arm further comprises a fifth blade mount; wherein said fourth and fifth blade mounts are non-coplanar with said first, second, and third blade mounts, but are spaced a third distance from each other substantially equal to said first distance with said swing arm in said extended position.

23. The saw frame of claim 1 wherein said first type of saw blade and said second type of saw blade are different from each other, with said second type of saw blade being substantially shorter than said first type of saw blade.

24. The saw frame of claim 1 wherein said auxiliary blade of said second type may be operatively mounted via said auxiliary blade mounting mechanism independently of any blade mount associated with said handle, including independently of said first blade mount.

25. The saw frame of claim 24 wherein said first type of saw blade and said second type of saw blade are different from each other, with said second type of saw blade being substantially shorter than said first type of saw blade.

26. The saw frame of claim 23 wherein, when said auxiliary blade of said second type is operatively mounted to said auxiliary blade mount mechanism, said auxiliary blade extends forward from said frame generally parallel to said swing arm in said storage position.

* * * * *